US006989675B2

(12) United States Patent
Kesil et al.

(10) Patent No.: US 6,989,675 B2
(45) Date of Patent: Jan. 24, 2006

(54) METHOD AND APPARATUS FOR PRECISION MEASUREMENT OF FILM THICKNESS

(75) Inventors: Boris Kesil, San Jose, CA (US); Leonid Velikov, San Carlos, CA (US); Yuri Vorobyev, San Carlos, CA (US)

(73) Assignee: MultiMetrixs LLC, Santa Clara, CA (US)

(*) Notice: Subject to any disclaimer, the term of this patent is extended or adjusted under 35 U.S.C. 154(b) by 0 days.

(21) Appl. No.: 10/386,648

(22) Filed: Mar. 13, 2003

(65) Prior Publication Data

US 2004/0178343 A1 Sep. 16, 2004

(51) Int. Cl.
*G01R 27/32* (2006.01)

(52) U.S. Cl. .......................................... 324/636; 324/644

(58) Field of Classification Search ................. 324/644, 324/637, 636, 633, 635
See application file for complete search history.

(56) References Cited

U.S. PATENT DOCUMENTS

| | | | | |
|---|---|---|---|---|
| 4,943,778 A | * | 7/1990 | Osaki | 324/636 |
| 5,072,172 A | * | 12/1991 | Stolarczyk et al. | 324/332 |
| 5,334,941 A | | 8/1994 | King | |
| 5,748,003 A | * | 5/1998 | Zoughi et al. | 324/644 |
| 5,781,008 A | | 7/1998 | Muller et al. | |
| 6,072,313 A | | 6/2000 | Li et al. | |
| 6,184,694 B1 | * | 2/2001 | Anderson et al. | 324/635 |
| 6,366,096 B1 | * | 4/2002 | Talanov et al. | 324/633 |
| 6,396,288 B1 | * | 5/2002 | Nagata et al. | 324/631 |
| 6,445,191 B1 | * | 9/2002 | Trummer | 324/635 |
| 6,532,806 B1 | * | 3/2003 | Xiang et al. | 73/105 |

OTHER PUBLICATIONS

Loren F. Root and Irving Kaufman, "Noncontacting low–cost instrument for film thickness measurement" Dec. 1992, IEEE Transactions on Instrumentation and Measurement, vol. 41, No. 6, pp. 1014–1019.*

U.S. Appl. No. 09/954,550, filed 2001, Kesil et al.

Staplethorne Ltd. (UK) . RMS1000 Radiometric System for Measuring Thickness of Films by X–ray Reflectivity.

I. Herman. "Optical Diagnostics for Thin Film Processing", Academic Press, 1996, Chapter 9.

Semiconductor Material and Device Characterization, John Wiley & Sons, Inc., N.Y., 1990, pp. 2–40, by D. Schroder.

* cited by examiner

*Primary Examiner*—Anjan Deb

(57) ABSTRACT

An apparatus for measuring thickness in super-thin films consists of a special resonator unit in the form of an open-bottom cylinder which is connected to a microwave swept frequency microwave source via a decoupler and a matching unit installed in a waveguide that connects the resonator unit with the microwave source. The apparatus operates on the principle that thin metal film F, the thickness of which is to be measured, does not contact the end face of the open bottom of the cylindrical resonator sensor unit and functions as a bottom of the cylindrical body. The design of the resonator excludes generation of modes other than the resonance mode and provides the highest possible Q-factor. As the conductivity directly related to the film thickness, it is understood that measurement of the film thickness is reduced to measurement of the resonance peak amplitudes. This means that superhigh accuracy inherent in measurement of the resonance peaks is directly applicable to the measurement of the film thickness or film thickness deviations.

32 Claims, 6 Drawing Sheets

METHOD AND APPARATUS FOR PRECISION MEASUREMENT OF FILM THICKNESS

FIELD OF THE INVENTION

The present invention relates to the field of measurement of film thickness, more specifically, to measuring thickness of conductive films on various conductive substrates. In particular, the invention may find use in measuring thickness of coating films on semiconductor wafers, hard-drive disks, or the like.

BACKGROUND OF THE INVENTION

There exists a great variety of methods and apparatuses used in the industry for measuring thickness of coating films and layers applied or laid onto substrates. These methods and apparatuses can be classified in accordance with different criteria. Classification of one type divides these methods into direct and indirect.

An example of the direct method is measurement of a thickness in thin metal coating films by means of so-called X-ray reflectivity. One of these methods is based on a principle that X-rays and gamma rays are absorbed by matter. When a beam of rays passes through a material, the amount of the beam absorbed depends on what elements the material consists of, and on how much of the material the beam has to pass through. This phenomenon is used to measure the thickness or density of a material. The advantage of measuring in this way is that the gauge does not have to touch the material it is measuring. In other words, in thickness measurement, the surface of a web or strip product will not be scratched. The instrument for this method is e.g., RMS1000 Radiometric System produced by Staplethorne Ltd (UK). The instrument uses a suitable radiation source and one or more radiation detectors installed in a mechanical housing which also provides high quality radiological shielding. The source may be an X-ray tube or a radioactive source. The instrument also uses a set of beam defining collimators and one or more radiation detectors. The detectors measure the radiation absorbed within the object or flow being measured and output of the signal data to a computer. For thickness gauging, the collimators usually define a single, narrow beam. This gives optimum spatial resolution. A disadvantage of radiation methods is the use of X-ray or gamma radiation that requires special safety measures for protection of the users against the radiation. The instruments of this type are the most expensive as compared to metrological equipment of other systems.

Another example of direct measurement is a method of optical interferometry, described e.g., by I. Herman in "Optical Diagnostics for Thin Film Processing", Academic Press, 1996, Chapter 9. Although the optical interferometry method produces the most accurate results in measuring the thickness of a coating film, it has a limitation. More specifically, for conductive films, to which the present invention pertains, this method is limited to measurement of extremely thin coating films which are thin to the extent that a nontransparent material, such as metal, functions as transparent. In other words, this method is unsuitable or is difficult to use for measuring conductive films thicker than 200 Å to 500 Å.

Another example of direct measurement methods is measuring thickness of a film in situ in the course of its formation, e.g., in sputtering, magnetron target sputtering, CVD, PVD, etc. These methods, which are also described in the aforementioned book of I. Herman, may involve the use of the aforementioned optical interferometry or ellipsometry. However, in this case measurement is carried out with reference to both the surface of the substrate and the surface of the growing layer. Therefore, this method is inapplicable to measuring thickness of the film that has been already deposited.

In view of the problems associated with direct methods, indirect non-destructive methods are more popular for measuring thickness of ready-made films. An example of a well-known non-destructive indirect method used for measuring thickness of a film is the so-called "four-point probe method". This method is based on the use of four contacts, which are brought into physical contact with the surface of the film being measured. As a rule, all four contacts are equally spaced and arranged in line, although this is not a compulsory requirement. Detailed description of the four-point probe method can be found in "Semiconductor Material and Device Characterization" John Wiley & Sons, Inc., N.Y., 1990, pp. 2–40, by D. Schroder. The same book describes how to interpret the results of measurements. This method is classified as indirect because the results of measurement are indirectly related to the thickness of the film. It is understood that each measurement of electric characteristics has to correlated with the actual thickness of the film in each particular measurement, e.g., by cutting a sample from the object and measuring the thickness of the film in a cross-section of the sample, e.g., with the use of an optical or electron microscope. Nevertheless, in view of its simplicity, low cost, and convenience of handling, the four-point probe method is the most popular in the semiconductor industry.

However, the four-point method has some disadvantages. The main problem associated with the aforementioned four-point probe method is that in each measurement it is required to ensure reliable contact in each measurement point. This is difficult to achieve since conditions of contact vary from sample to sample as well as between the four pointed contact elements of the probe itself in repeated measurement with the same probe. Such non-uniformity affects the results of measurements and makes it impossible to perform precision calibration.

Known in the art are also methods for measuring film thickness with the use of inductive sensors. For example, U.S. Pat. No. 6,072,313 issued in 2000 to L. Li et al. describes in-situ monitoring and control of conductive films by detecting changes in induced eddy currents. More specifically, the change in thickness of a film on an underlying body such as a semiconductor substrate is monitored in situ by inducing a current in the film, and as the thickness of the film changes (either increase or decrease), the changes in the current are detected. With a conductive film, eddy currents are induced in the film by generating an alternating electromagnetic field with a sensor, which includes a capacitor and an inductor. The main idea of the apparatus of U.S. Pat. No. 6,072,313 consists in using a resistor and a capacitor in a parallel resonance circuit. The resonance is caused by means of an oscillator. The inductive coupling between the oscillation circuit and the Eddy current inducted in the coating is used for improving a signal/noise ratio and can be used for improving quality of measurements. In fact, this is a method well known in the radioelectronics for measuring under conditions of the electrical resonance. The above patent describes the aforementioned inductive method for measuring thickness of a film in chemical mechanical polishing (CMP).

A similar inductive method, which was used for measuring thickness of a slag, is disclosed in U.S. Pat. No.

5,781,008 issued in 1998 to J. Muller et al. The invention relates to an apparatus for measuring the thickness of a slag layer on a metal melt in a metallurgical vessel. The apparatus comprises a first inductive eddy current sensor which indicates the distance of the apparatus from the metal melt as it is moved toward the melt. A second sensor detects when the apparatus reaches a predetermined distance relative to or contacts the slag layer and triggers the inductive eddy-current sensor when such distance is attained. The sensors are arranged in a predetermined spatial relation, and the thickness of the slag layer is determined by an evaluation device, which analyzes the received signals. The apparatus permits measurement of the thickness of the slag layer without the need of additional equipment (e.g. mechanical lance movement or distance measurement).

The method and apparatus of U.S. Pat. No. 5,781,008 relate to macro-measurements of thick layers, and the sensors used in the apparatus of this invention are inapplicable for measuring thickness of thin-film coatings on such objects as semiconductor wafers and hard-drive disks. Furthermore, once the second sensor has detected that the apparatus reached a predetermined distance relative to or contacts the slag layer, this distance remains unchanged during the measurement procedure. This condition is unacceptable for measuring thickness of a thin film with microscopic thickness, which moves relative to the sensor, e.g., for mapping, i.e., for determining deviations of the thickness over the substrate.

In order to understand why the use of known eddy-current sensor systems utilizing a measurement eddy-current sensor and a proximity sensor cannot be easily and directly applicable to measurement of microscopically-thin film coatings on conductive or non-conductive substrates, let us consider constructions and operations of the aforementioned known systems in more detail.

Generally speaking, all inductive sensors are based on the principle that in its simplest form an inductive sensor comprises a conductive coil, which is located in close proximity to a conductive film to be measured and in which an electric current is induced. The conductive film can be considered as a short-circuited virtual coil turn with a predetermined electrical resistance. Since a mutual inductance exists between the aforementioned conductive coil and the virtual coil turn, an electric current is generated in the virtual coil turn. This current is known as eddy current or Foucault current. Resistance of the virtual coil turn, which depends on the material of the conductive film and, naturally, on its thickness, influences the amplitude of the alternating current induced in the virtual turn. It is understood that the amplitude of the aforementioned current will depend also on the thickness of the conductive film.

However, realization of a method and apparatus based on the above principle in application to thin films is not obvious. This is because such realization would involve a number of important variable parameters which depend on a specific mode of realization and which are interrelated so that their relationships not always can be realized in a practical device.

In order to substantiate the above statement, let us consider the construction of an inductive sensor of the aforementioned type in more detail.

FIG. 1 is a schematic view of a known inductive sensor used, e.g., for positioning of an inductive sensor 22' relative to the surface S' of an object 24'. Let us assume that the surface S' of the object 24' is conductive. The inductive sensor comprises an electromagnetic coil 26' connected to an electronic unit 28', which, in turn, is connected to a signal processing unit 30'. The latter can be connected, e.g., to a computer (not shown). The electronic unit 28' may contain a signal oscillator (not shown), which induces in the electromagnetic coil 26' an alternating current with a frequency within the range from several kHz to several hundred KHz. In FIG. 1, symbol D designates the distance between the electromagnetic coil 26' and the surface S.

In a simplified form, the sensor of FIG. 1 can be represented by a model shown in FIG. 2. In this model, L1 designates inductance of the electromagnetic coil 26'; R1 designates resistance of the coil 26'; L2 designates inductance of the aforementioned virtual coil turn 27' (FIG. 1); and R2 is electrical resistance of the aforementioned virtual coil turn 27'. M designates mutual induction between L1 and L2.

It can be seen from the model of FIG. 2 that the amplitude of current I generated in coil 26' will depend on R1, L1, L2, R2 and M. It is also understood that in this influence M is the most important parameter since it directly depends on the distance D (FIG. 1) from the inductive sensor 22' to the surface S.

FIG. 3 is further simplification of the model of FIG. 2. Parameters L and R are functions that can be expressed in terms of L1, L2, M, R1, and R2. Therefore, as shown in FIG. 3, these parameters can be considered as functions L(D) and R(D), where D is the aforementioned distance (FIG. 1).

The model of FIG. 3 can also be characterized by a quality factor Q, which is directly proportional to the frequency of the current in the sensor coil 26', to inductance of the sensor of FIG. 3, and is inversely proportional to a distance D (FIG. 1) from the sensor coil 26' to the surface S. The higher is the value of Q, the higher is stability of the measurement system and the higher is the measuring accuracy. Thus it is clear that in order to achieve a higher value of Q, it is necessary to operate on higher frequencies of the alternating currents in the inductance coil 26'. Analysis of relationships between Q, L, and R for a fixed distance D was made by S. Roach in article "Designing and Building an Eddy Current Position Sensor" at http://www.sensormag.com/articles/0998/edd0998/main.shtml. S. Roach introduces an important parameter, i.e., a ratio of D to the diameter of the sensor coil 26', and shows that R does not practically depend on the above ratio, while the increase of this parameter leads to the growth in L and Q. When distance D becomes equal approximately to the diameter of the coil 26', all three parameters, i.e., L, Q, and R are stabilized, i.e., further increase in the distance practically does not change these parameters. In his important work, S. Roach generalized the relationships between the aforementioned parameters and showed that, irrespective of actual dimensions of the sensor, "the rapid loss of sensitivity with distance strictly limits the range of eddy current sensor to about ½ the coil diameter and constitutes the most important limitation of this type of sensing".

The impedance of the coil also depends on such factors as film thickness, flatness of the film, transverse dimensions, temperature of the film and coil, coil geometry and DC resistance, operating frequency, magnetic and electric properties of the film, etc.

As far as the operating frequency of the inductive coil is concerned, the sensor possesses a self-resonance frequency, which is generated by an oscillating circuit formed by the power-supply cable and the capacitor. As has been shown by S. Roach, in order to improve sensitivity, it is recommended to increase the quality factor Q and hence the frequency.

However, the sensor must operate on frequencies at least a factor of three below the self-resonant frequency. Thus, practical frequency values for air core coils typically lie between 10 kHz and 10 MHz.

The depth of penetration of the electromagnetic field into the conductive film is also important for understanding the principle of operation of an inductive sensor. It is known that when an alternating electromagnetic field propagates from non-conductive medium into a conductive medium, it is dampened according to an exponential law. For the case of propagation through the flat interface, electric and magnetic components of the alternating electromagnetic field can be expressed by the following formulae:

$$E=E_0\exp(-\alpha x)$$

$$H=H_0\exp(-\alpha x),$$

where $\alpha=(\pi f\mu_o\mu\sigma_{DC})^{1/2}$, f is oscillation frequency of the electromagnetic field, $\sigma_{DC}$ is conductivity of the medium measured on direct current, and $\mu_0=1.26\times10^{-6}$ H/m (for non-magnetic materials $\mu=1$). Distance x from the interface, which is equal to $$x=\delta=1/\alpha=1/(\pi f\mu_o\sigma_{DC})^{1/2} \quad (1a)$$

and at which the amplitude of the electromagnetic wave decreases by e times, is called the depth of penetration or a skin layer thickness. Based on formula (1a), for copper on frequency of 10 kHz the skin depth δ is equal approximately to 650 μm, on frequency of 100 kHz to 200 μm, on frequency of 1 MHz to 65 μm, on frequency of 10 MHz to 20 μm, on frequency 100 MHz to 6.5 μm, and on frequency 10 GHz to 0.65 μm.

The above values show that for the films used in the semiconductor industry, which are typically with the thickness on the order of 1 μm or thinner, the electromagnetic field can be considered practically as uniform. This is because on any frequency in the range from 10 KHz to 10 MHz the electromagnetic waves begin to dampen on much greater depth than the thickness of the aforementioned films. It is only on frequencies substantially greater than 100 MHz (e.g., 10 GHz), the depth of penetration of the electromagnetic fields becomes comparable with the thickness of the film.

Similar trend is observed in the films made from other metals, where the skin layer is even thicker because of lower conductivity. At the same time, deviations from uniformity in the thickness of the conductive coating films used in the semiconductor industry, e.g., copper or aluminum layers on the surface of silicon substrates, should not exceed 5%, and in some cases 2% of the average thickness of the layer. In other words, the deviations should be measured in hundreds of Angstroms. It is understood that conventional inductive sensors of the types described above and used in a conventional manner are inapplicable for the solution of the above problem. Furthermore, in order to match conditions of semiconductor production, such sensors must have miniature constructions in order to be installed in close proximity to the measurement site. The distance between the measurement element of the inductive sensor and the surface of the film being measured also becomes a critical issue. Due to high sensitivity, the sensor becomes very sensitive to the influence of the environment, especially, mechanical vibrations, variations in temperature, etc.

In their previous U.S. patent application Ser. No. 09/954,550 filed on Sep. 17, 2001, the applicants made an attempt to solve the above problems by developing a method and apparatus for measuring thickness and deviations from the thickness of thin conductive coatings on various substrates, e.g., metal coating films on semiconductor wafers or hard drive disks. The thickness of the films may be as small as fractions of microns. The apparatus consists of an inductive sensor and a proximity sensor, which are rigidly interconnected though a piezo-actuator used for displacements of the inductive sensor with respect to the surface of the object being measured. Based on the results of the operation of the proximity sensor, the inductive sensor is maintained at a constant distance from the controlled surface. Variations in the thickness of the coating film and in the distance between the inductive sensor and the coating film change the current in the inductive coil of the sensor. The inductive sensor is calibrated so that, for a predetermined object with a predetermined metal coating and thickness of the coating, variations in the amplitude of the inductive sensor current reflect fluctuations in the thickness of the coating. The distinguishing feature of the invention resides in the actuating mechanism of microdisplacements and in the measurement and control units that realize interconnection between the proximity sensor and the inductive sensor via the actuating mechanism. The actuating mechanism is a piezo actuator. Measurement of the film thickness in the submicron range becomes possible due to highly accurate dynamic stabilization of the aforementioned distance between the inductive sensor and the object. According to one embodiment, the distance is controlled optically with the use of a miniature interferometer, which is rigidly connected to the inductive sensor. According to another embodiment, the distance is controlled with the use of a capacitance sensor, which is also rigidly connected to the inductive sensor.

However, the sensor disclosed in the aforementioned patent application could not completely solve the problems associated with accurate measurement of super-thin films, e.g., of those thinner than 500 Angstroms. This is because the construction of the aforementioned sensor is limited with regard to the range of operation frequencies, i.e., the sensor cannot be use in frequencies exceeding 30 MHz. Furthermore, the aforementioned sensor requires the use of a complicated distance-stabilization system. The above problems restrict practical application of the method and apparatus of U.S. patent application Ser. No. 09/954,550 for measuring thickness of very thin films and deviations from the thickness in the aforementioned films. Furthermore, it is obvious that the aforementioned method and apparatus do not allow thickness measurement of non-conductive films. The sensor has relatively large overall dimensions and comprises a stationary measurement instrument.

Another disadvantage of the sensor of the aforementioned application is that it is very sensitive to the distance between the sensor and the film. This requirement dictates the use of expensive and complicated distance-measurement means such as microinterferometers or microscopes.

In order to solve the above problems, the applicants have developed a new apparatus and method for measuring thickness and deviations from the thickness of very thin conductive coatings on various non-conductive substrates, or of very thin non-conductive coatings on conductive substrates. These apparatus and method are disclosed in U.S. Pat. No. 6,815,958 issued on Nov. 9, 2004. The apparatus consists of an inductive coil having specific parameters, an external AC generator operating on frequencies, e.g., from 50 MHz to 2.5 GHz, preferably from 100 MHz to 200 MHz, and a measuring instrument, such as an oscilloscope, voltmeter, etc. for measuring output of the sensor. The coil has miniature dimensions. The invention is based on the principle that inductive coil of the sensor, active resistance of the coil winding, inherent capacitance of the inductive coil (or a separate capacitor built into the sensor's circuit), and the aforementioned AC generator form a parallel oscillating circuit. The apparatus operates on very high resonance frequencies, preferably within the range of 100 to 200 MHz, at which a capacitive coupling is established between the coil of the oscillating circuit and the thin films being measured. By measuring the parameters of the resonance oscillating circuit, it becomes possible to measure film thickness below 500 Angstroms.

Although the method and apparatus disclosed in U.S. Pat. No. 6,815,958 make it possible to measure thickness of very thin films, the aforementioned capacitive coupling can still be established in a limited range of frequencies. Furthermore, rapid development of semiconductor technology demands that the accuracy of measurement be even higher than the one attainable with the method and apparatus described in the aforementioned patent application.

It is understood that for measuring a 1000 Angstroms-thick film, even with 5% accuracy, the sensor should depict thickness deviations at least within 50 Angstroms. It is also understood that improvement in the accuracy of measurement of superthin film with specific electromagnetic sensors can be achieved by increasing the frequency of electromagnetic radiation (up to microwave frequency) utilized by such sensors for testing. An example of such a sensor is the one disclosed in U.S. Pat. No. 5,334,941 issued in 1994 to R. King. Although the aforementioned sensor is described in application for measuring complex impedance characteristics of the surface, one can assume that such a resonance sensor can be used also for measuring thickness of thin films. The sensor system consists of a microwave source with a frequency that can be swept within a limited range, a radio-reflectometer bridge, a microwaveguide line that connects the reflectometer bridge with the resonance sensor, and a ratio meter or scalar network analyzer connected to the microwave source and the radio-reflectometer bridge for visual presentation and data monitoring of the test operation. The sensor has a special slit-like structure, which comprises a metal microstrip dipole resonator etched on the surface of a dielectric substrate, which is bonded to a copper ground. This dipole resonator is electromagnetically driven by mutual inductive coupling to a short nonresonant feed slot formed in the ground plane. The slot is driven by a coaxial feed line or a microstrip feed line extending from a swept microwave frequency source, which excites the incident wave. Measurement of the resonant frequency and input coupling factor determines small changes in real and imaginary parts of the dielectric constant or in conductivity for highly conductive materials, such as metals.

In spite of the fact that the microwave reflection resonator sensor described in U.S. Pat. No. 5,334,941 is a device which after a special calibration procedure may appear to be highly efficient and accurate for measuring sufficiently thin films (down to 1000 Angstroms), this sensor may operate only in physical contact with the test object, which is not always permitted in the semiconductor industry where the use of contactless test sensors is preferable.

Thus, an inexpensive, simple, high-accurate and efficient contactless microwave resonance sensor system suitable for measuring film thicknesses below 1000 Angstroms is unknown.

SUMMARY OF THE INVENTION

It is an object of the present invention to provide a method and apparatus for inexpensive, simple, high-accurate and efficient contactless measurement of film thicknesses below 1000 Angstroms by means of a microwave resonance sensor.

The apparatus of the invention consists of a special resonator unit in the form of an open-bottom cylinder, which is connected to a microwave swept frequency microwave source via decoupler and a matching unit installed in a waveguide that connects the resonator unit with the microwave source. The microwave generator is fed from a power supply unit through a frequency modulator that may sweep the frequency of microwaves generated by the microwave generator. All the controls can be observed with the use of a display, such as, e.g., a monitor of a personal computer, which may be connected to the microwaveguide line, e.g., via a directed branched waveguide line for directing waves reflected from the resonator, via a reflected wave detector, an amplifier, a synchronous detector, an A/D converter, and a digital voltmeter. A feedback line is going from a direct wave detector, which is installed in a line branched from the microwaveguide between the decoupler and the matching unit, to the power supply unit. The operation resonance frequency of the resonator sensor unit should be somewhere within the range of swept frequencies of the microwave generator.

During operation of the apparatus, the thin metal film F, which is to be measured, does not contact the end face of the open bottom of the cylindrical resonator sensor unit and functions as a bottom of the cylindrical body. In designing the cylindrical resonator, it is necessary to choose inner diameter d and the inner length a of the cylindrical body in such a ratio that excludes generation, near the resonance frequency, of modes other than the basic operation mode. Another design requirement of the resonator dimensions is to provide the highest possible Q-factor.

In operation, the microwave generator generates electromagnetic waves in a certain sweeping range that induces in the resonator sensor unit oscillations on the resonance frequency with a Q-factor on the order of $10^4$ or higher. A distinguishing feature of the resonator of the invention is that the design parameters of the resonator unit allow to achieve the aforementioned high Q-factor without physical contact of the sensor unit with the film to be tested. As the surface of the film to be measured constitutes the inner surface of the resonator unit, even a slightest deviation in conductivity will exert a significant influence on the Q-factor. The Q-factor, in turn, defines the height of the resonance peak. As the conductivity directly related to the film thickness, it is understood that measurement of the film thickness is reduced to measurement of the resonance peak amplitudes. This means that superhigh accuracy inherent in measurement of the resonance peaks is directly applicable to the measurement of the film thickness or film thickness deviations.

DETAILED DESCRIPTION OF THE INVENTION

Figure 4:
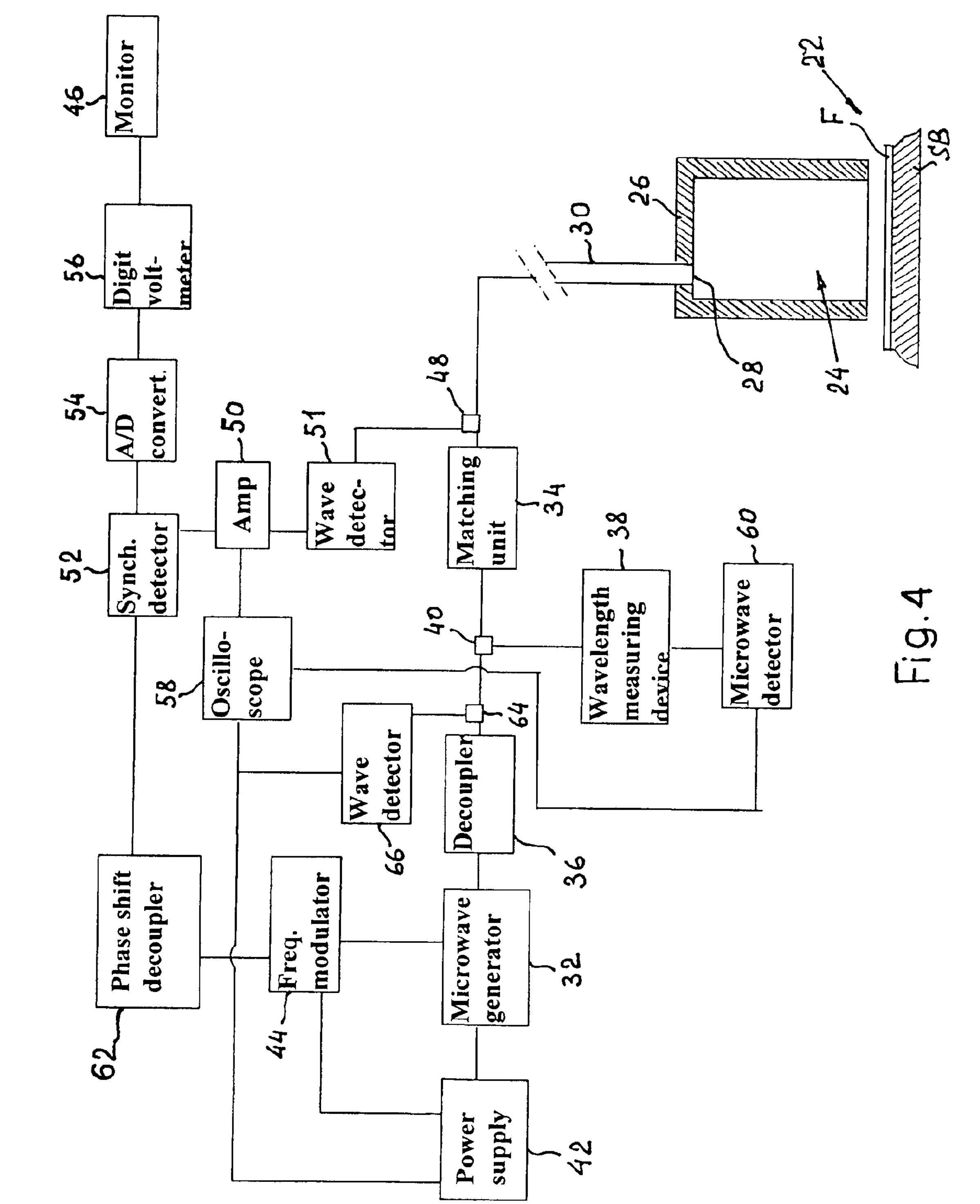
FIG. 4 is a general block-diagram view of the apparatus of the present invention for precision measurement of film thickness with the use of a cylindrical microwave resonator.

The apparatus, which as a whole is designated by reference numeral 20, will be described in general in order to show main components and their interconnections, and then the main units will be described separately in more detail. It should be understood that the specific components and their arrangement shown in FIG. 4 represent only one possible example of the apparatus, which can be embodied in a variety of other acceptable modifications.

The main unit or heart of the apparatus is a cylindrical microwave resonator unit 22 which functions as a film-thickness sensor unit for measuring the thickness of a conductive thin film F placed on a non-conductive substrate SB. The resonator unit 22 comprises a cylindrical body, which has one end 24 (which faces the film F) open in a non-working state of the resonator and another end covered by a membrane 26 with an opening 28 for connection of one end of a microwaveguide line 30. The opposite end of the microwaveguide line 30 is connected to a microwave generator 32, e.g., a Klystron-type microwave generator or a Gunn-type microwave diode, via a matching unit 34 and an isolator or decoupling unit 36. The function of the microwave generator is to generate microwave power on a sweeping microwave frequency for transmission through a microwaveguide line 30 to the cylindrical microwave resonator unit 22, while the decoupling unit 36 prevents penetration of the waves reflected from the cylindrical microwave resonator unit 22 to the microwave generator 32.

A wavelength measuring device 38 may be branched by means of a branched waveguide 40 from the microwaveguide line 30 on a section thereof between the decoupling unit 36 and the matching unit 34.

The microwave generator 32 is fed from a power supply unit 42 through a frequency modulator 44 that may sweep the frequency of microwaves generated by the microwave generator 32.

All the controls can be observed with the use of a display, such as, e.g., a monitor 46 of a personal computer which is connected to microwaveguide line 30 via a directed branched waveguide line 48 for directing waves reflected from the resonator unit 22, via a reflected wave detector 51, an amplifier 50, a synchronous detector 52, an A/D converter 54, and a digital voltmeter 56 to the monitor 46.

The apparatus is also provided with an oscilloscope 58. The modulator 44 is connected to the synchronous detector 52 through a phase-shifting decoupling unit 62. A microwaveguide line 64 with a detector 66 is branched from the waveguide line 30 on a portion thereof between the matching unit 34 and the decoupling unit 36 in order to supply the detected signal of the microwave generator 32 to an oscilloscope 58 for signal control and through a feedback line 37 to the power supply unit 42 for stabilization of frequency, if necessary. This line contains a microwave-length detector 60, which is connected to a wavelength measuring device 38 for measuring the wavelength of the microwaves generated by the generator 32 and to the oscilloscope for control and observation. The oscilloscope 58 is also used for observing and controlling resonance signals reflected from the resonance sensor unit 22. For this purpose, a line 57 is provided between the oscilloscope 58 and the reflected wave detector 51.

Figure 5A:
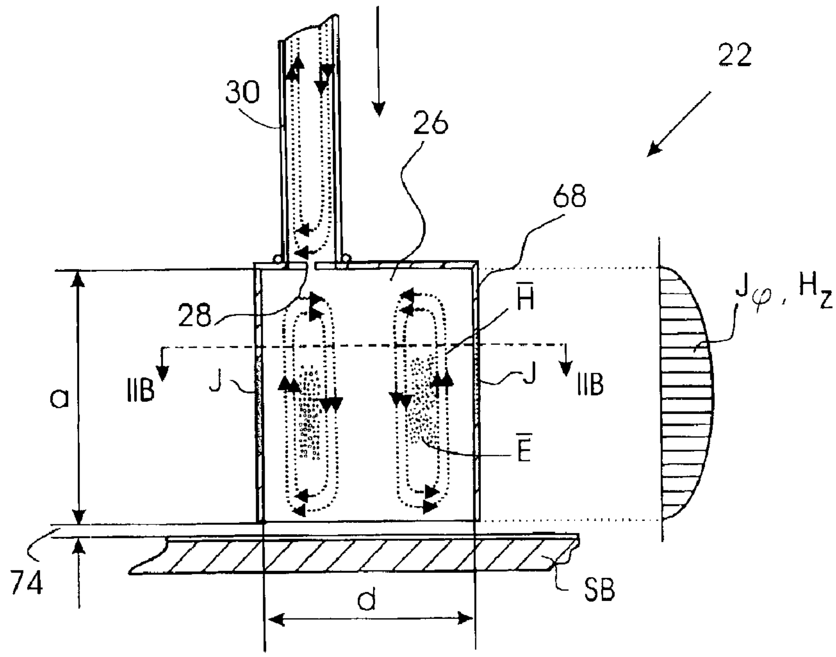
FIG. 5A is a schematic vertical sectional view of the cylindrical resonator unit of FIG. 4.
Figure 5B:
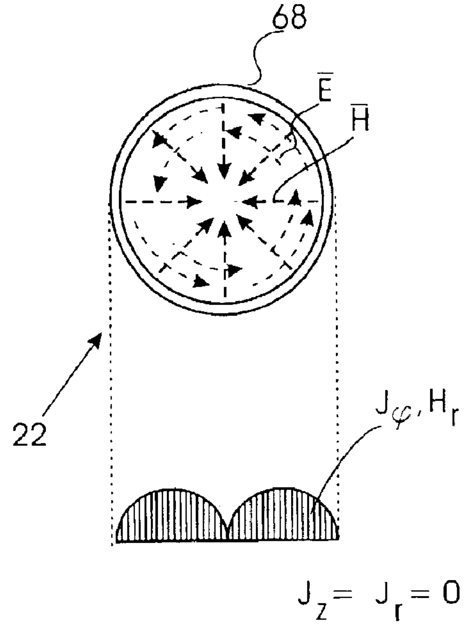
FIG. 5B is sectional view of the resonator unit along lines IIB—IIB of FIG. 5A.

As has been mentioned above, one of the main units of the apparatus 12 of the invention is a cylindrical resonator unit 22 with the bottom closed in an inoperative state of the resonator. During operation of the apparatus, the function of the bottom that closes the cylindrical resonator unit 22 is fulfilled by the thin metal film F, the thickness of which is to be measured. In designing the cylindrical resonator unit 22, it is necessary to choose inner diameter d and the inner length a of the cylindrical body 68 in such a ratio that excludes generation of other modes near the inherent resonance frequency. Dimensions d and a are shown in FIG. 5A, which is a schematic vertical sectional view of the cylindrical resonator unit 22. FIG. 5B is sectional view of the resonator unit 22 in lines IIB—IIB of FIG. 5A. As will be shown later, measurement accuracy of the method of the invention depends, among other factors, on the so-called load-free Q-factor $Q_u$. Among a variety of various definitions of the Q-factor, the one most convenient for use in conjunction with a microwave cylindrical resonator unit is based on a general energy relation that links the Q-factor with a reactive energy accumulated in the system (resonator), when the latter works in the mode of steady-state oscillations with the energy that dissipates though the system during one oscillation period T. This condition can be written as follows:

$$Q_o = 2\pi \frac{W_{accum}}{(W_{diss})_T} = \omega_o \frac{W_{accum}}{P_{diss}} \quad (1)$$

where $W_{accum}$ designates the accumulated energy, $W_{diss}$ designates the dissipated energy, $P_{diss}$ designates the power dissipated in the resonator unit 22, and $\omega_o$ is an inherent resonance frequency equal to $2\pi/T$.

Let us use equation (1) for a general case of a hollow resonator unit. The energy accumulated in the resonator unit is constant and is equal to the sum of energies of electrical and magnetic fields. Let us chose the moment when the magnetic field passes through the maximum and, hence, when the electric field in the resonator is equal to zero. In this case, the accumulated energy is expressed through the amplitude of the magnetic field intensity H as follows:

$$W_{accum} = \int_V \frac{\mu \mu_o |\overline{H}|^2}{2} dV \quad (2)$$

where V is the volume of the resonator unit, and $\mu$ is the relative permeability of the dielectric that fills the resonator unit. In a majority of practical cases for non-magnetic materials, it can be assumed that $\mu=1$.

If the resonator unit is filled with a dielectric substance without losses, then dissipation of energy is associated only with the Joulean losses in the resonator walls (see Landau- Lifshitz, Vol. 8, paragraphs 59 and 87). As follows from equation (2), with reference to the surface effect, resistance on the unit surface of the resonator's wall $R_{surf}$ is equal to $1/\sigma_{DC}\delta$, where $\sigma_{DC}$ is a specific conductivity of the material of the resonator walls measured on direct current, $\delta$ is the depth of penetration of the field to the wall.

The magnitude of thermal losses of power averaged for one period can be determined by integrating over the entire inner surface S of the resonator walls:

$$P_{diss} = \int_S \frac{1}{2}|\vec{J}|^2 R_{surf}\, dS, \tag{3}$$

where $|\vec{J}|$ is a modulus of the surface current density amplitude in the resonator wall. In equation (3), $|\vec{J}|$ can be replaced by the modulus of the tangential component of high-frequency magnetic field $|\overline{H}_t|$ near the resonator walls.

The value of $\overline{H}_t$ is determined from wave equations assuming that the resonator walls have ideal conductivity.

The entire energy dissipated in the resonator unit during a single period is equal to:

$$(W_{diss})_T = P_{diss}T = \frac{T}{2\sigma_{DC}\delta}\int_S |\overline{H}_t|^2 dS, \tag{4}$$

The aforementioned equation can be simplified by expressing active conductivity of the resonator walls $\sigma_{DC}$ in terms of the surface layer thickness $\delta$:

$$\sigma_{DC} = \frac{2}{\delta^2 \omega\, \mu_{DC}\mu_O}, \tag{5}$$

where $\mu_{DC}$ is a relative magnetic permeability of the material of the resonator wall. In the case of non-magnetic films, $\mu_{DC}$ is always equal to 1.

Thus, according to equation (1) with reference to equations (2) and (3), inherent Q-factor of the resonator can be expressed as follows:

$$Q = \frac{2}{\delta}\frac{\mu}{\mu_{DC}}\frac{\int_V |\overline{H}|^2 dV}{\int_S |\overline{H}_t|^2 dS}. \tag{6}$$

Based on the assumption that neither the resonator walls nor the dielectric substance that fills the resonator possesses magnetic properties, i.e., that $\mu_{DC}=1$, the following can be written:

$$Q = \frac{2}{\delta}\frac{\int_V |\overline{H}|^2 dV}{\int_S |H_t|^2 dS}. \tag{7}$$

If equations of the field generated in a hollow resonator unit have been determined, equation (7) can be used for calculating parameters of an evacuated or gas-filled hollow resonator unit.

In order to evaluate the quality of the obtained equations, let us assume that the field generated in the resonator unit is free of variations, i.e., that $|\overline{H}|=|\overline{H}_t|$=Const. Then the following expression (8) can be derived from equation (7):

$$Q = \frac{2}{\delta}\frac{V}{S}. \tag{8}$$

Thus, in a first approximation the inherent Q-factor of the hollow resonator unit is proportional to a ratio of the resonator volume to the resonator surface. As a rule, linear dimensions of the resonator are proportional to the working wavelength $\lambda$. Thus, it can be concluded that $V \approx \lambda^3$ and $S \approx \lambda^2$. With the accuracy up to a small constant multiplier, equation (8) can be simplified into equation (9) given below:

$$Q \approx \lambda/\delta.$$

Knowing the wavelength $\lambda$ and assuming that the walls of the resonator are made from a metal of high electrical conductivity, one can easily find that in the centimeter range of the wavelength the value of $\delta$ will be on the order of several microns or fractions of micron. This means that Q may be equal to about $10^5$.

Figure 1:
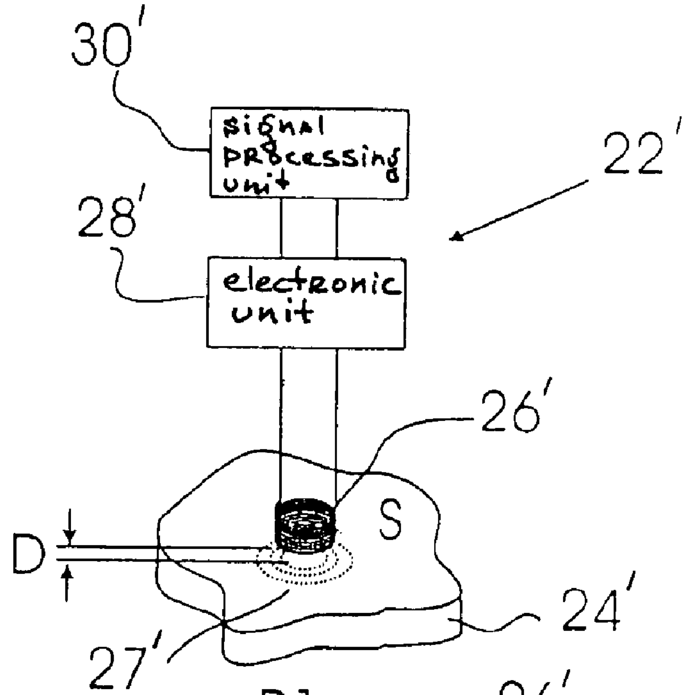
FIG. 1 is a schematic view of a known inductive sensor used, e.g., for positioning of an inductive sensor relative to the surface of an object.
Figure 2:
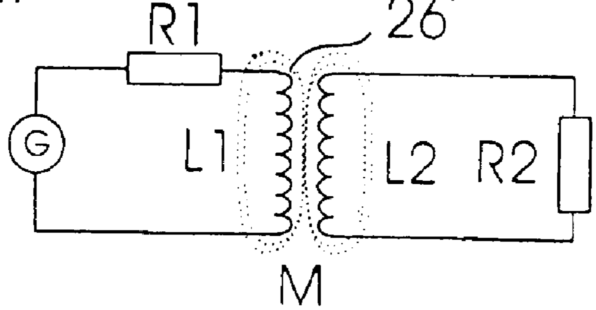
FIG. 2 is a simplified model of the sensor of FIG. 1.
Figure 3:
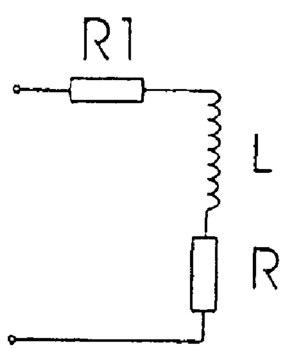
FIG. 3 is further simplification of the model of FIG. 2.

In the embodiment illustrated below, the apparatus 20 of the invention utilizes the cylindrical resonator unit 22 with modes $TE_{011}$, since it has sufficiently high Q-factor and since no electric currents flow between the resonator walls and the resonator end face. As is known, each mode is characterized by a specific pattern of the electric and magnetic fields. Mode $TE_{011}$ is shown in FIGS. 2A and 2B. More specifically, the spatial distribution of electrical and magnetic fields is shown in FIGS. 2A and 2B in cross-sections of the resonator unit 22, where lines of electrical fields are shown in FIG. 5A by plus signs and small circles and where lines of the magnetic field H are shown in FIG. 5B by arrows directed radially inwardly. It can be seen that electric current flows neither in longitudinal direction of the resonator nor in the radial direction, but only in the azimuthal direction $\phi$. Distribution of electric current density ($J_\phi$) in the resonator unit wall is shown by the distribution curves on the right side of resonator unit image in FIG. 5A and under the resonator unit image in FIG. 5B. Such directions of the electrical and magnetic fields make it possible to use the test film F on the substrate SB as an end-face plate of the resonator unit 22 (FIGS. 1 and 2A).

Figure 6A:
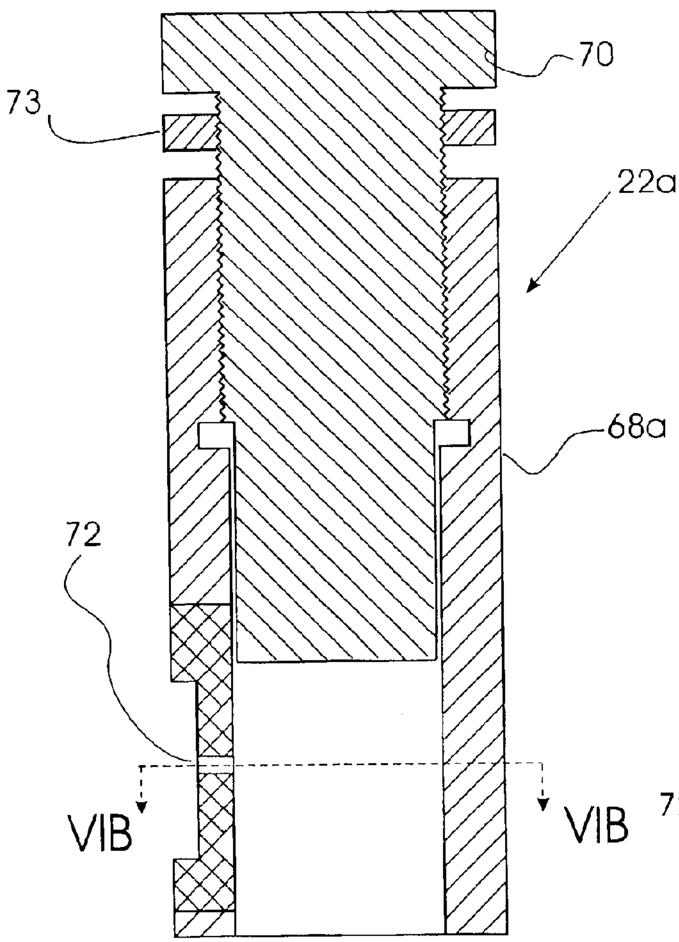
FIG. 6A is a vertical sectional view of a modified resonator unit of the invention.
Figure 6B:
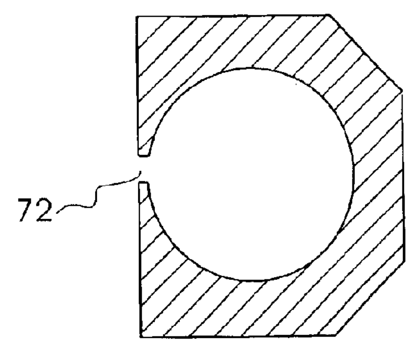
FIG. 6B is a sectional view of the modified resonator unit along the line VIB—VIB of FIG. 6A.

FIG. 6A is a vertical sectional view of a modified resonator unit 22*a* of the invention. FIG. 6B is a sectional view of the modified resonator unit along the line VIB—VIB of FIG. 6A. As shown in FIG. 6A, the resonance frequency $\omega_o$ of the resonator unit 22*a* can be adjusted within some range if the resonator unit 22*a* is provided with a plunger 70 that forms the upper end face of the resonator body 68*a*. In such a construction, the resonance frequency $\omega_o$ will depend on the vertical position of the plunger 70 in the resonator. The plunger 70 can be moved vertically by screwing or unscrewing via threaded interconnection between the plunger and the cylindrical part of the resonator body 68*a*. In this case, the resonator unit 22*a* is excited through a slit 72 in the sidewall of the resonator. Reference numeral 73 designates a lock nut for locking the plunger 70 in the adjusted position.

The arrangement of electrical and magnetic fields shown in FIGS. 2A and 2B makes good electrical contact, between the test film F on the substrate SB and the end face of the cylindrical body 68, unnecessary.

If a gap 74 (FIG. 5A) is left between the lower end face of the cylindrical part 68 of the resonator and the film F, then other modes will also be suppressed, as the aforementioned gap will not allow the passage of surface currents. What is important is that the mode $TM_{111}$, which has the current flow through the resonator walls, which may coexist with the aforementioned mode $TE_{011}$, will also be suppressed because the flow of current through the gap 74 is impossible.

Formula (5) allows to make an important conclusion that for providing the resonator with the maximal Q-factor, the length a of the cylindrical resonator 22 (FIG. 5A) should be approximately equal to its diameter d.

As has been mentioned above, the test film F functions as the lower end face of the microwave resonator unit 22. It is known that the depth δ of penetration of an electromagnetic field into metal can be represented by the following expression (10) (see formula (5)):

$$\delta = \sqrt{\frac{2}{\omega\mu_{DC}\mu_O\sigma_{DC}}}. \tag{10}$$

With reference to the depth of penetration of the electromagnetic field into the material of the resonator walls, unit surface resistance $R_{surf}$ on the inner surface of the microwave resonator can be expressed as follows:

$$R_{surf} = \frac{1}{\sigma_{DC}\delta}, \tag{11}$$

where, as defined above, $\sigma_{DC}$ is a specific conductivity of the material of the resonator walls measured on direct current. Base on this expression, resistance of the metal layer having thickness δ and the unit length and unit width, i.e., the specific surface resistance or the actual part of the surface impedance (see Vol. 8 of Landau-Lifshitz, paragraphs 59, 87), can be expressed by the following formula:

$$R_{surf} = \sqrt{\frac{\omega\mu_{DC}\mu_o}{2\delta_{pc}}}. \tag{12}$$

For the microwave resonator unit with the geometry of the maximal Q-factor, the surface resistance on side walls is represented by the following equation:

$$R_{cyl} = \pi d^2\sqrt{\frac{\omega\mu_{DC}\mu_o}{2\delta_{DC}}}, \tag{13}$$

while surface resistance on the end faces will be expressed as follows:

$$R_t = \frac{\pi d^2}{2}\sqrt{\frac{\omega\mu_{DC}\mu_o}{2\delta_{DC}}}. \tag{14}$$

Taking into account the equations (1), (3), (13) and (14), it can be concluded that even a slightest variation in $R_t$ may cause significant variations in Q. This means that for Q within the range of $10^4$ to $10^5$, variation in $R_t$ by several percents or a fraction of one percent may exert a significant influence on the Q-factor and can be measured by the above-described method of the invention with sufficiently high accuracy. Depth of penetration of electromagnetic fields operating on various frequencies into copper and aluminum films calculated by formula (10) is shown in Table 1 (data for copper included into Table 1 has been given above).

TABLE 1

Skin depth δ in microns for various metals and frequencies

| Metal | Conductivity ×10⁶ s/m | Skin depth (μm) 100 MHz | 1 GHz | 10 GHz | 40 GHz | 90 GHz |
|---|---|---|---|---|---|---|
| Copper | 58 | 6.6 | 2.1 | 0.7 | 0.33 | 0.2 |
| Aluminum | 38 | 8.2 | 2.6 | 0.8 | 0.4 | 0.25 |

It can be assumed from Table 1 that for metal films of the type used at the present time in semiconductor chips and having a thickness of less than 0.5 μm, accurate measurements require frequencies that exceed 20 GHz. The method and apparatus of the invention are applicable for films even thinner than 0.1 μm. In fact, if the film thickness Δ is less than the depth of the skin layer δ, then in formula (11) δ should be replaced by Δ, and the specific surface resistance will be represented by the following equation:

$$R_{surf}=1/(\sigma_{DC}\cdot\Delta) \tag{15}$$

Formulae (6) and (7) can also be converted by the above replacement, while formulae (8) and (9) remain unchanged. In this case, all previous conclusions remain true.

Figure 7A:
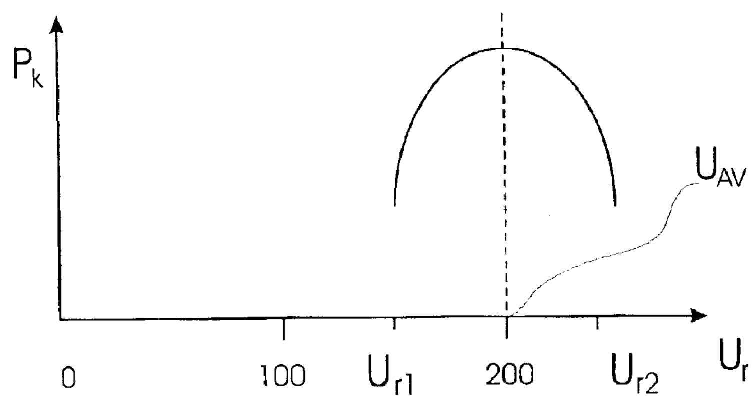
FIG. 7A is a graph that shows dependence of the output power of the klystron from the voltage applied to the klystron reflector in the apparatus of the invention.

During operation of the apparatus 20, the microwave generator 32 is activated by means of the power supply unit 42 with the modulator 44. The sweeping frequency range of the microwaves generated by generator 32 is selected so as to overlap the resonance frequency $\omega_o$ of the resonator unit 22, which is excited from the generator 32 via the microwave guide 30. FIGS. 4A, 4B, and 4C illustrate operation of the generator 32 in form of a klystron, although microwave generator of any other suitable type can be used. More specifically, FIG. 7A shows dependence of output power $P_k$ of the klystron from the voltage applied to the klystron reflector (not shown). It can be seen that if a sinusoidal voltage is applied to the klystron with the amplitude of voltage variable from $U_{r1}$ to $U_{r2}$ for an average (constant) value of 200 V, the output power $P_k$ will vary periodically in accordance with the pattern shown FIG. 7A with the sweeping period.

Figure 7B:
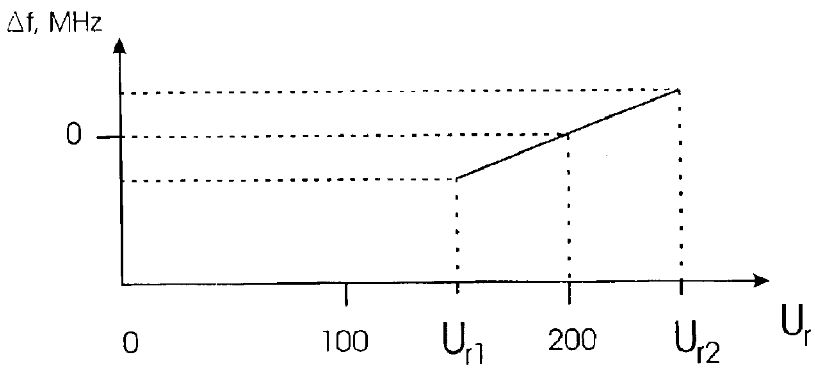
FIG. 7B is a graph that illustrates dependence of frequency deviation from a certain generation frequency that corresponds to a constant voltage on the klystron reflector.

FIG. 7B illustrates dependence of frequency deviation Δf from a certain generation frequency that corresponds to a constant voltage $U_{rv}$ on the klystron reflector. Let us assume that the resonance frequency of the resonator unit 22 corresponds to Δf=0. Then the signal from the directed diode 51 will correspond to the image shown in FIG. 7C. Signals shown in FIGS. 4A and 4C can be observed on the oscilloscope 58, provided that the sweep of the signal on the oscillographscope 58 is carried out under control of the modulator unit 44 (FIG. 7).

Figure 7C:
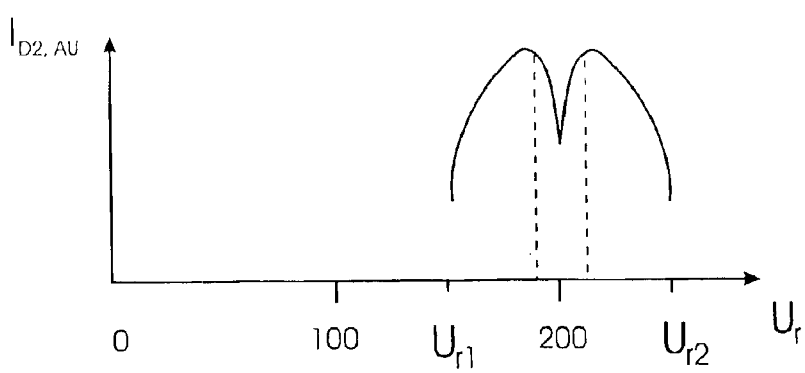
FIG. 7C shows an image that corresponds to the signal from the directed diode in the apparatus of the invention.

During measurement, the amplitude of modulation or sweeping, i.e., the sweeping amplitude on the klystron reflector (not shown), is reduced to the level that corresponds to resonance or half-resonance on the resonator unit (see broken lines in FIG. 7C).

The procedure of measuring the thickness of film F is, in fact, measurement of the amplitude of the signal (e.g., current signal on diode 51) under resonance conditions. The procedure of synchronous detection makes it possible to further improve the accuracy of measurements since measurements are carried out on the sweeping frequency.

In the method and apparatus of the invention, the magnitude of the gap 74 between the film F and the end face of the resonator unit 22 that faces the film F is an important parameter. This is because variations in the gap 74 leads to variation in the volume of the resonator unit and hence in the intrinsic resonance frequency $\omega_o$. However, variations in Q-factor associated with variations in $\omega_o$, are insignificant as compared to changes caused by losses under the effect of variations in the resonance frequency. Therefore, the microwave generator 32 should be of the type that allows adjustment of frequency in a certain small range.

Figure 8:
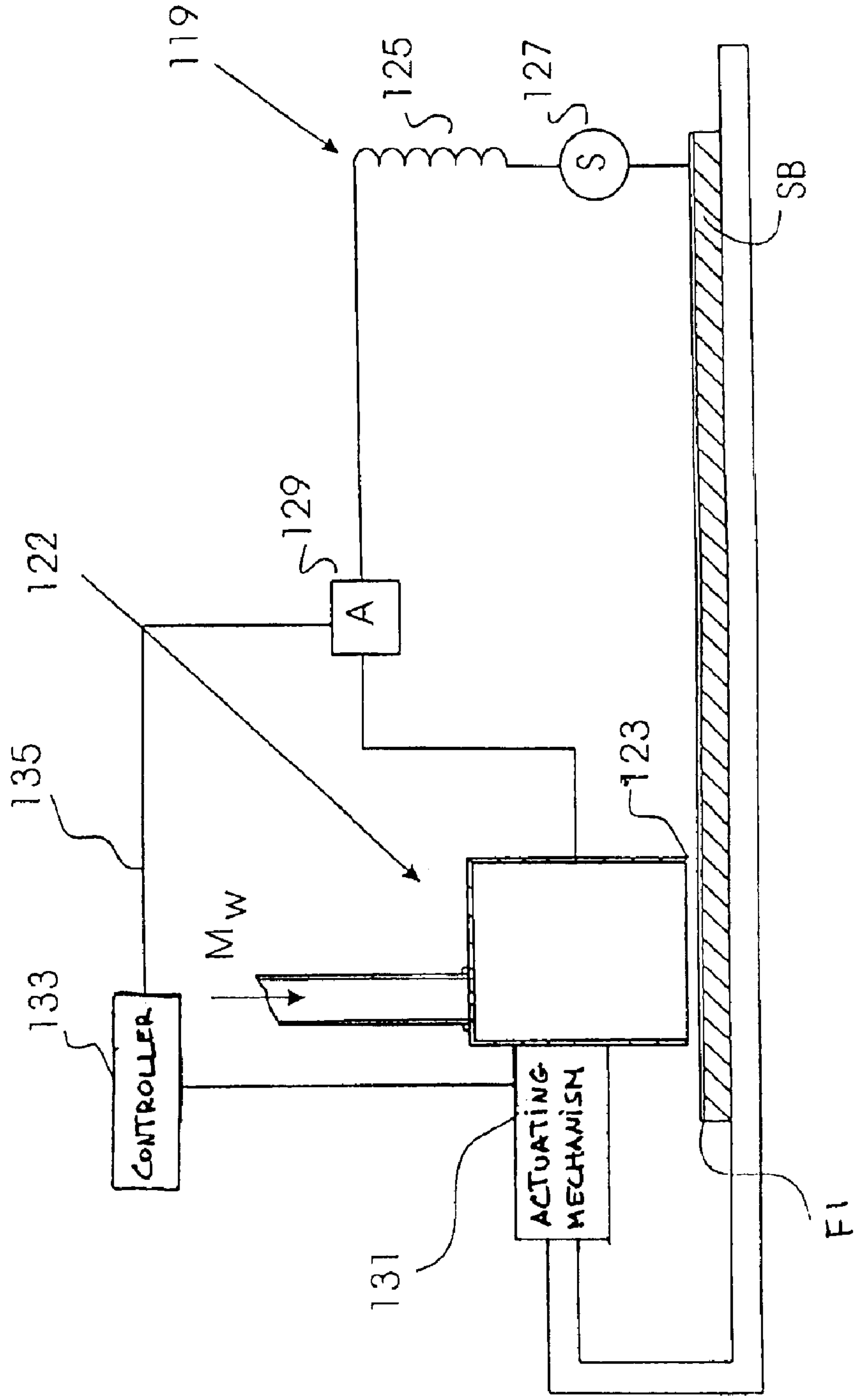
FIG. 8 illustrates a system for stabilization of the gap between the lower end face of the resonator unit and the film to be measured in the apparatus of the invention, where the resonator unit and the film form plates of a capacitor.

On the other hand, significant improvement in the accuracy of measurement may be achieve by stabilizing the gap 74. Mechanisms suitable for stabilization of the gap 74 are described in the aforementioned U.S. patent application Ser. No. 09/954,550. For example, as shown in FIG. 8, which illustrates a system for stabilization of the gap 74 in the apparatus 20 of the invention, the resonator unit 122 and the film F1 to be measured may form plates of a capacitor 123 which is included into an oscillation circuit 119 that contains an inductance coil 125, an AC generator 127, and a measurement instrument, e.g., an ampermeter 129, is connected to an actuating mechanism 131 via a controller 133 installed in a feedback circuit 135. The actuating mechanism 131 may comprise a piezoactuator 131 for controlling relative positions between the resonator unit 122 and the film F1. It is important that the operation frequency of the oscillating circuit 119 be noticeably distinctive from the resonance frequency $\omega_o$ of the generator 32, e.g., lower than $\omega_o$, but significantly greater than the sweeping frequency of the generator 32 (FIG. 4). This is needed for exclusion of interferences between the respective frequencies.

Another item important for the method and apparatus of the invention is the magnitude of the film area tested in one measurement. As can be seen from aforementioned formulae (8) and (9), the value of the Q-factor decreases with an increase in the working frequency of the resonator unit 22. However, evaluation shows that the method and apparatus of the invention are practically applicable to frequencies up to 120 GHz. At higher frequencies the method and apparatus encounter a problem associated with manufacturing accuracy of the resonator system, especially with regard to the membrane 26 with an opening 28 (FIG. 4) in the upper part of the resonator unit 22. For resonator units 22 working at frequencies exceeding 120 GHz the size of the test area diameter on the film F will become close to 1 mm. On lower frequencies, e.g., at 10 GHz, the test area may have a diameter equal to about 1 cm or more.

Thus, among other things, the closed cavity resonator of the invention is comprised of a source of microwave energy, resonance control means, and a closed microwave resonator unit operating on a resonance frequency and having a hollow cylindrical body with one end face closed during measurement by the thin film via the gap and comprising a functional and indispensable part of the closed microwave resonator unit.

The invention has been shown and described with reference to specific embodiments, which should be construed only as examples and do not limit the scope of practical applications of the invention. Therefore any changes and modifications in technological processes, constructions, materials, shapes, and their components are possible, provided these changes do not depart from the scope of the attached patent claims. For example, the apparatus system shown in FIG. 4 is given in a simplified form sufficient for understanding the principle of the invention, and it is understood that all the components of this system as well as their arrangement may be modified and changed, provided that the main component of the system, i.e., the open-end cylindrical resonator unit 22 may fulfill its functions under control of the aforementioned components. For example, the generator 32 may be of an avalanche transit-time diode. A commercial scalar network analyzer can be used for data analysis instead of the synchronous detector 52, A/D converter 54, etc. The measurement components and components of the waveguides, such as the wavelength detector 66, decouplers 36, 40, 48, etc. may be either excluded or replaced by members combined into an integrated microstrip. The entire system of FIG. 4 may be produced as a compact integral module with the resonator unit and the macrowave generator. Externally such a unit may have only a remote control and connectors to the power supply. The resonator unit 22 may have a toroidal shape and may work on a mode different from $TE_{011}$, e.g., on the $TE_{012}$ mode. The method and apparatus of the invention may control thickness in non-conductive films, provided that they are supported on conductive substrates. Although the embodiment described above was considered in implementation to films with non-magnetic properties, i.e., with $\mu$ different from 1, such as Ni and Cr alloys, the principle of the invention may be applicable to measuring the contents of magnetic components of such alloys, provided that the thickness of the test film is known. The apparatus of the invention may be realized in the form of a portable instrument or a stationary machine with a sample table having appropriate adjustments. If the thickness of the film is known, the apparatus and method of the invention can be used for precision measurement of any properties associated with conductivity.

What is claimed is:

1. An apparatus for precision measurement of the thickness of a thin film via a gap without physical contact with said film, said apparatus comprising: a source of microwave energy; resonance control means; a closed microwave resonator unit operating on a resonance frequency and having a hollow cylindrical body with one end face closed during measurement by said thin film via said gap and comprising a functional and indispensable part of said closed microwave resonator unit; a closed end on the side opposite to said one end face; and linking means for linking said microwave resonator unit with said source of microwave energy and with said resonance control means; during said precision measurement said thin film being spaced from said one end face with said gap and functioning as a resonator wall that closes the microwave resonance circuit through said closed microwave resonator unit.

2. The apparatus of claim 1, wherein said closed end is a membrane and said linking means comprises an opening formed in said membrane.

3. The apparatus of claim 1, wherein said hollow cylindrical body has a side wall and said linking means comprises a slit formed in said side wall.

4. The apparatus of claim 3, wherein said closed end comprises a plunger adjustable in said hollow cylindrical body.

5. The apparatus of claim 1, wherein said hollow cylindrical body has an inner diameter and an inner height equal to a distance from said one end to said closed end inside said hollow cylindrical body, said inner diameter being substantially equal to said inner height.

6. The apparatus of claim 5, wherein said closed microwave resonator unit has an operation resonance mode $TE_{011}$.

7. The apparatus of claim 6, wherein said closed microwave resonator unit has a Q-factor within the range of $10^3$ to $10^5$.

8. The apparatus of claim 5, further comprising gap adjustment means for maintaining said gap at a constant value for stabilization of said resonance frequency.

9. The apparatus of claim 1, wherein said source of microwave energy generates microwaves with a frequency within the range from 2.5 GHz to 120 GHz.

10. The apparatus of claim 9, wherein said closed microwave resonator unit has an operation resonance mode $TE_{011}$.

11. The apparatus of claim 10, wherein said closed microwave resonator unit has a Q-factor within the range of $10^3$ to $10^5$.

12. The apparatus of claim 11, wherein said closed microwave resonator unit has a Q-factor within the range of $10^3$ to $10^5$.

13. The apparatus of claim 9, further comprising gap adjustment means for maintaining said gap at a constant value for stabilization of said resonance frequency.

14. The apparatus of claim 1, wherein said source of microwave energy generates microwaves with a frequency within the range from 60 GHz to 90 GHz.

15. The apparatus of claim 14, wherein said closed microwave resonator unit has an operation resonance mode $TE_{011}$.

16. The apparatus of claim 14, further comprising gap adjustment means for maintaining said gap at a constant value for stabilization of said resonance frequency.

17. The apparatus of claim 1, wherein said closed microwave resonator unit has an operation resonance mode $TE_{011}$.

18. The apparatus of claim 17, wherein said closed microwave resonator unit has a Q-factor within the range of $10^3$ to $10^5$.

19. The apparatus of claim 1, further comprising gap adjustment means for maintaining said gap at a constant value for stabilization of said resonance frequency.

20. The apparatus of claim 1, wherein said closed microwave resonator unit has a Q-factor within the range of $10^3$ to $10^5$.

21. A method for precision measurement of the thickness of a thin film comprising the steps of:

providing a microwave energy source, resonance control means, and a closed microwave resonator unit having a hollow cylindrical body with one end face closed during measurement by said thin film via said gap and comprising a functional and indispensable part of said closed microwave resonator unit, a closed end on the side opposite to said one end, and linking means for linking said closed microwave resonator unit with said microwave energy source and with said resonance control means;

energizing said microwave resonance unit by supplying thereto a microwave energy from said microwave energy source;

positioning said one end of said hollow cylindrical body close to said thin film with a gap at which said thin film functions as a resonator wall that closes the microwave resonance circuit with a current flowing through said resonator wall of said closed microwave resonator unit;

exciting in said closed microwave resonance unit a resonance mode;

measuring an amplitude of said current; and determining the thickness of said thin film by comparing the amplitude of said current with calibration data.

22. The method of claim 21, further comprising the step of preventing the penetration into said closed microwave resonance unit of modes other than said resonance mode.

23. The method of claim 22, providing means for moving said closed end of said hollow cylindrical body by making it in the form of a plunger adjustable in said hollow cylindrical body.

24. The method of claim 21, wherein source of microwave energy generates microwaves with a frequency within the range from 2.5 GHz to 120 GHz.

25. The method of claim 24, wherein said closed microwave resonator unit has an operation resonance mode $TE_{011}$.

26. The method of claim 25, providing means for moving said closed end of said hollow cylindrical body by making it in the form of a plunger adjustable in said hollow cylindrical body.

27. The method of claim 24, further comprising the step of maintaining said gap at a constant value for stabilization of said resonance frequency.

28. The method of claim 24, said closed microwave resonator unit operates with a Q-factor within the range of $10^3$ to $10^5$.

29. The method of claim 25, further comprising the step of maintaining said gap at a constant value for stabilization of said resonance frequency.

30. The method of claim 25, said closed microwave resonator unit operates with a Q-factor within the range of $10^3$ to $10^5$.

31. The method of claim 21, further comprising the step of maintaining said gap at a constant value for stabilization of said resonance frequency.

32. The method of claim 21, said closed microwave resonator unit operates with a Q-factor within the range of $10^3$ to $10^5$.

* * * * *